United States Patent [19]

Nelson

[11] 4,017,041
[45] Apr. 12, 1977

[54] AIRFOIL TIP VORTEX CONTROL

[76] Inventor: Wilbur C. Nelson, 1540 Cedar Bend Drive, Ann Arbor, Mich. 48103

[22] Filed: Jan. 12, 1976

[21] Appl. No.: 648,247

[52] U.S. Cl. .............................. 244/40 R; 244/41; 244/91; 416/23; 416/142
[51] Int. Cl.² ........................................ B64C 23/00
[58] Field of Search ................ 244/40 R, 40 A, 41, 244/42 D, 91, 130; 416/23, 24, 142, 236 A

[56] References Cited

UNITED STATES PATENTS

| | | | |
|---|---|---|---|
| 1,724,110 | 8/1929 | Reid | 244/91 |
| 1,763,257 | 6/1930 | Roscoe | 244/91 X |
| 2,120,760 | 6/1938 | Lumiere | 244/91 |
| 2,576,981 | 12/1951 | Vogt | 244/91 |
| 2,649,265 | 8/1953 | Grant | 244/91 |
| 2,805,032 | 9/1957 | Davis | 244/91 X |
| 2,852,209 | 9/1958 | Petre | 244/42 D |
| 2,885,161 | 5/1959 | Kerker et al. | 244/91 X |
| 3,129,908 | 4/1964 | Harper | 244/41 X |
| 3,471,107 | 10/1969 | Ornberg | 244/41 |
| 3,545,701 | 12/1970 | Bertin et al. | 244/42 R X |
| 3,588,005 | 6/1971 | Rethorst | 244/41 |
| 3,596,852 | 8/1971 | Wakefield | 244/130 X |
| 3,693,913 | 9/1972 | Barland et al. | 244/130 |
| 3,845,918 | 11/1974 | White | 244/91 X |

OTHER PUBLICATIONS

"Vortex Wakes of Conventional Aircraft", Aeronautical Research Associates of Princeton, Inc., Princeton, New Jersey, May, 1975.

Primary Examiner—Trygve M. Blix
Assistant Examiner—Barry L. Kelmachter
Attorney, Agent, or Firm—Woodhams, Blanchard and Flynn

[57] ABSTRACT

Device for diminishing tip vortices in an aircraft. For the purpose of diminishing the tip vortices generated by aircraft there are provided retractable foils at or near the airfoil, as wing, tips in question and projecting upwardly and/or downwardly therefrom. The operation of the retractable foils is satisfactory if such foils are parallel to the centerline of the aircraft but it is preferable if such foils are angled slightly with respect thereto, such as if the leading edge of the upper foil is angled approximately 10° inwardly toward the fuselage of the aircraft and the bottom foil is oppositely angled also approximately 10°. The retractable foils, in addition to diminishing wing tip vortices, also when used on wing tips improve the rate of climb of an aircraft at a given engine setting and appear to diminish the area over which the major amounts of noise generated by the aircraft will be dispersed. The foils may be fully retractable into the aircraft wing, but if not fully retracted, they will each provide a small streamlined ridge projecting upwardly and/or downwardly adjacent the tip of the aircraft wings which will improve the lift characteristics of the wings by diminishing air flow around the end of the wings sufficiently to move than compensate for the drag otherwise created. The foils are also advantageously applicable to other aircraft components, such as flaps, stabilizers or elevators.

23 Claims, 16 Drawing Figures

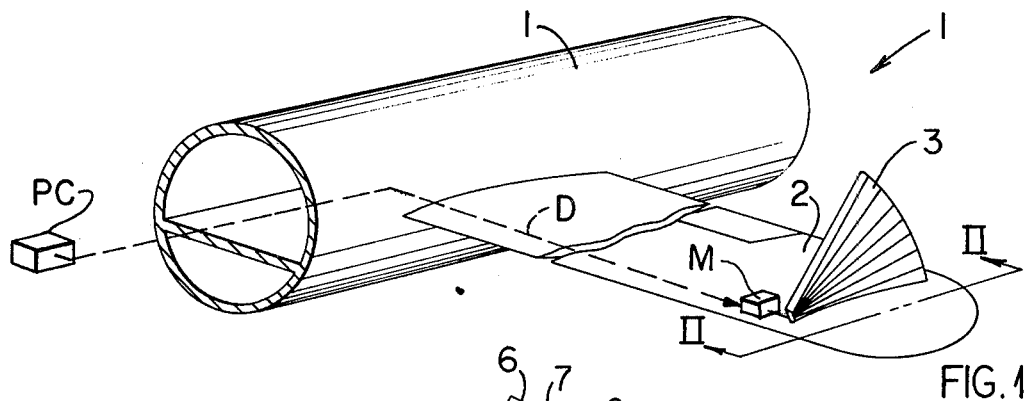
FIG. 1
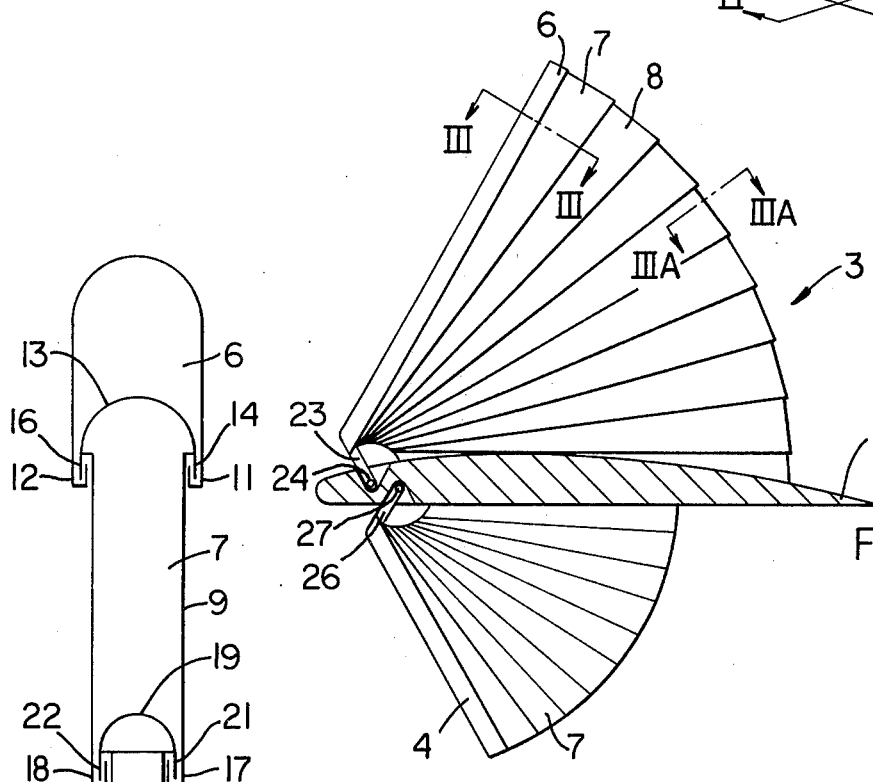
FIG. 2
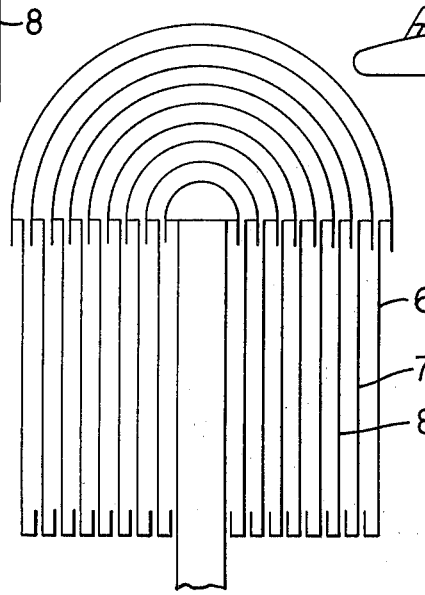
FIG. 3
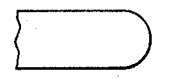
FIG. 3A
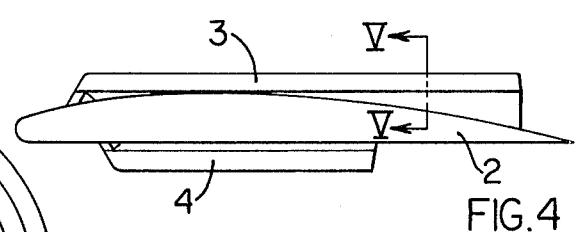
FIG. 4
FIG. 5

- NO END PLATES
- ⊘ 2 OUTBOARD VERTICAL FOILS, REARWARD POSITION, UPPER FOIL 91.5% CHORD-CANTED 8°; LOWER FOIL 50% CHORD-CANTED -10°
- ▽ 2 OUTBOARD VERTICAL FOILS, FORWARD POSITION, UPPER FOIL 50% CHORD-CANTED 10°; LOWER FOIL 25% CHORD-CANTED -10°
- △ UPPER OUTBOARD VERTICAL FOIL, FORWARD POSITION, AT 50% OF CHORD LENGTH-CANTED 10°

- NO END PLATES
- △ 2 VERTICAL FOILS AT 50% OF CHORD LENGTH, UPPER FOIL CANTED 15°, LOWER FOIL CANTED -15°
- ▽ 2 VERTICAL FOILS AT 50% OF CHORD LENGTH, UPPER FOIL CANTED 20°, LOWER FOIL CANTED -20°

AIRFOIL TIP VORTEX CONTROL

FIELD OF THE INVENTION

The invention relates to aircraft airfoil construction and particularly to the provision of retractable foils extending upwardly and/or downwardly from the aircraft airfoil, preferably at or close to an end thereof, aligned parallel, if desired, to the longitudinal centerline of the aircraft, but preferably angled slightly with respect thereto. Such foils will reduce the tip vortices otherwise generated by such aircraft airfoils and same have other beneficial effects, such as providing for an increased rate of climb at a given engine setting and improving the air flow characteristics of the airfoil. It is also believed that there are beneficial effects with respect to control and/or possible reduction of noise created by the aircraft.

BACKGROUND OF THE INVENTION

While the phenomenon of tip vortices has been recognized by aircraft designers for a very long period of time, such as at least 50 or 60 years, and a variety of devices for controlling or minimizing same have been proposed from time to time over a substantial portion of such period, the problem has in the past been considered one which was not capable of an economically acceptable solution and hence a problem to be tolerated. This has become particularly serious in more recent years, since the advent of large aircraft such as the Boeing 747, in that wing tip vortices of dangerous magnitude have been known from the initial appearance of such aircraft to extend for several miles behind them and to be of such magnitude as to cause severe adverse effects upon following aircraft. In some instances, aircraft as large as the Boeing 737 have been known to experience roll of as much as 90° when caught in the wing tip vortex three or four miles behind a Boeing 747. While this has presented no great problem in the airways as such, in view of the spacing normally maintained anyway between aircraft therein, it has for several years been a serious problem in the maneuvering of aircraft at or near airports. For example, it is known that the ground controllers and air traffic controllers at a major airport can handle aircraft following one behind the other at a spacing of as close as two miles. However, because of the wing tip vortices generated by large aircraft, particularly such aircraft as the Boeing 747, it is normally necessary to space an aircraft following a 747 by as much as a minimum of five and one-half miles behind said 747 and often more than that to avoid the adverse effects of the wing tip vortices as above-mentioned. For smaller aircraft, such as Boeing 727's or 737's, or even for DC 10's, the spacing does not need to be as great, but it still often needs to be greater than would be required by the control capacity of the ground control and air traffic control personnel. Thus, because of such wing tip vortices, it is not possible to space aircraft either incoming or outgoing from an airport as close together as it would otherwise be possible, and the hourly capacity of an airport for receiving aircraft to, and directing aircraft from, a ground position has been severely restricted. Thus, the problem has long been recognized as serious but same has defied a commercially acceptable solution.

The prior art is replete with efforts to meet this problem, some of such efforts extending back for many years. Some workers in the field have attempted to generate counter-vortices in the hope that such would at least diminish the intensity of the undesired vortices (U.S. Pat. No. 2,477,461). Other workers in the field have attempted to discharge jets of air into the central zone of the vortex in order to dissipate the intensity thereof (U.S. Pat. No. 3,841,587). Still others have positioned fixed plates adjacent the tip of the wing, said plates being positioned substantially perpendicular to the plane of the wing and parallel to the direction of travel of the aircraft which affects the flow of air across the wing surfaces in such a manner as to diminish the intensity of the vortices (U.S. Pat. No. 3,845,918 and No. 2,120,760).

A very recent study of this phenomenon was published in May 1975 by Aeronautical Research Association of Princeton, Inc., Princeton, New Jersey, under the title of "Vortex Wakes of Conventional Aircraft". This study included a review of previously known methods of accomplishing the destruction or minimizing of the vortex. The study further included a review of what the report describes as a rather extensive experimental program carried out by NASA which specifically involved an effort to reduce the wake hazard of 747 aircraft. The report concludes by stating that the diminution of the wake hazard is still largely an "undeveloped technology". Thus, in spite of the great amount of effort which has gone into examination and solving of this problem, insofar as I am aware nothing thus far made public has been capable of meeting the multiple requirements and restrictions upon such devices which include particularly: structural simplicity; effectiveness for reducing the wing tip vortices; substantial removal from operating position and from the airstream when the aircraft is flying in an area where its wake is immaterial, i.e. at a substantial distance from an airport; and such fail-safe characteristics that in the event of a malfunction of the controlling mechanism, the apparatus will tend to return to its inactive condition.

In the foregoing discussion, it has been assumed throughout that the undesirable aspects of wing tip vortices are manifested solely by disturbances to following aircraft and this is, of course, one of the major undesirable features of such. However, it is also known that wing tip vortices represent a loss in lift effectiveness of a wing and that if the pressure differentials between the lower and upper surfaces of a wing could be maintained undiminished to the extreme end of the wing, that is, prevented from draining or dissipating around the end of the wing, the lifting effectiveness of a given wing could be substantially improved.

While the discussion thus far has been directed toward vortices generated at the wing tips, it has likewise long been recognized that smaller, and in some instances even greater, vortices are generated at the ends of wing flaps. Therefore, it has long been equally desirable to provide means for preventing, or at least inhibiting, such wing flap vortices for the twin purposes of diminishing interferences with following aircraft as above described and for increasing the lift obtainable from a flap of given characteristics, such as length, width and cross-sectional contour.

Accordingly, the objects of the invention include:

1. To provide for aircraft airfoils, particularly wings and/or flaps, a relatively simple means for reducing the tip vortices generated thereby.

2. To provide such means which are inexpensive, reliable and which will be fail-safe.

3. To provide means, as aforesaid, which can be readily effective or ineffective at the will of the pilot.

4. To provide means, as aforesaid, which can be installed into existing aircraft or applied to new aircraft with a minimum of additional expense.

5. To provide means, as aforesaid, which can in a simple manner be visually checked by the pilot to apprise himself of its operability prior to take off or landing, as the case may be.

6. To provide means, as aforesaid, which even when retracted into nonoperating condition will as a secondary function improve the operation of the aircraft.

Other objects, purposes and advantages of the invention will be apparent to those acquainted with apparatus of this general type upon reading the following specification and inspecting the accompanying drawings.

BRIEF DESCRIPTION OF THE DRAWINGS

In the drawings:

FIG. 1 is a fragmentary, somewhat schematicized, view of an aircraft provided with one embodiment of the invention.

FIG. 2 is a section taken on the line II—II of FIG. 1.

FIGS. 3 and 3A are schematic sections taken on the lines III—III and IIIA—IIIA, respectively, of FIG. 2, with the foil of the invention in an extended position.

FIG. 4 is a section similar to FIG. 2 with the foils of the invention in retracted position;

FIG. 5 is a schematic section taken on the line V—V of FIG. 4.

SUMMARY OF THE INVENTION

Figure 6:
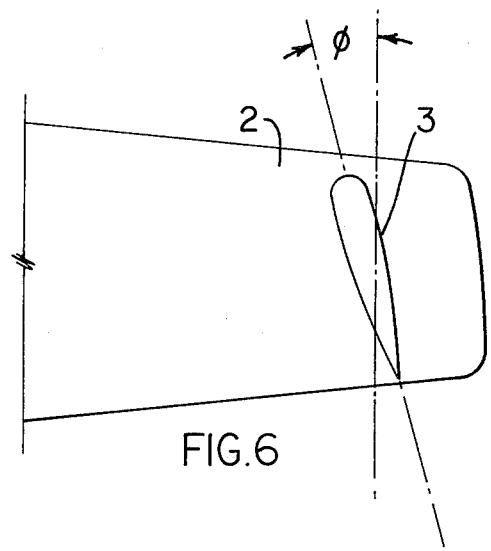
FIG. 6 is a top view of a wing at least similar to that of FIG. 1 showing the top foil in a preferred angled position with respect to the longitudinal centerline of the aircraft.

Briefly, the objects of the invention may be accomplished by providing a single retractable foil upstanding from the aircraft airfoil, such as a wing or flap, at or adjacent the tip thereof, and preferably also providing a similarly retractable foil depending from the lower surface thereof. The foils may be of many sizes and shapes, but are preferably extendable into operating position during operations at or near an airport and retractable into the wing for presenting a minimum profile during operations elsewhere. The foils may be respectively positioned parallel to the longitudinal centerline of the aircraft, but the operation is improved if the foils are angled with respect thereto, for example with the leading edge of the upper foil angled slightly toward said centerline and the leading edge of the lower foil angled slightly away therefrom. The foils of the invention have been determined by wind tunnel tests not only to diminish the tip vortices but also to improve the lift of a given airfoil, wing or flap, thereby to improve the rate of climb of an aircraft at a given power level or to diminish the landing speed of an aircraft having given airfoil characteristics, and it is believed that said foils will also have a beneficial effect in noise control by narrowing and possibly diminishing the intensity of noise pattern imposed on the ground by an aircraft, particularly a climbing aircraft.

DETAILED DESCRIPTION

Referring now to the drawings, the invention will first be discussed as applied to the wing tip of aircraft inasmuch as this is a typical but not the only possible application thereof. Directing attention first to FIG. 1, there is shown fragmentarily an aircraft of somewhat generalized form having a fuselage 1 and a wing 2. A foil 3 extends upwardly from said wing adjacent the tip thereof and is, in this embodiment, positioned parallel to the longitudinal centerline of the aircraft. In FIG. 2, the sectional fanlike nature of the foil 3 is shown in more detail together with the existence of the downwardly extending generally similar foil 4. In this embodiment, and preferably, the lower foil 4 is substantially smaller than the upwardly extending foil 3.

While many mechanical arrangements may be provided for making possible the upwardly extending and collapsing of the respective foils, in FIG. 2 said foils are shown as comprising a plurality of tapered segments of which two thereof are indicated at 6 and 7 and which are connected together by any convenient means, such as interlock means, shown in FIG. 3. In said figure, schematically showing the segments 6, 7 and 8, it is shown that the leading segment 6 is rounded at its forward edge to provide an aerodynamically desirable leading edge for same. The lower edge of said segment 6 is provided with internal grooves such as 11 and 12 for receiving and effecting an interlock with the next adjacent segment. Segment 7 is provided at its leading edge with a suitable rounded surface 13 which will nest snugly with the leading edge of the segment 6 and has at the lateral edges of said surface 13 flanges 14 and 16 which, when the foil is extended, will enter into and snugly engage the inner walls of the grooves 11 and 12. Similarly, the opposite edges of the segment 7 have internal grooves 17 and 18. The leading edge of the segment 8 is rounded at 19 for snug nesting with the leading edge 13 and it is provided with flanges 21 and 22 at its opposite side for reception into and snug engagement with the grooves 17 and 18. The rearward or trailing end of each foil segment is preferably closed, either rounded as shown in FIG. 3A or tapered to a point as desired. Thus, both the leading and trailing edges of each of the segments are closed and sealed in order to seal the entire foil, whether in the expanded or collapsed condition, against the entry thereinto of any portion of the airstream. The remaining segments are similarly constructed and arranged for similar interlocking to make the entire foil capable of extension or reception solely by actuation of the segment 6.

The foil 3 may be actuated in any convenient manner, such as by a lever schematically indicated at 23 which is suitably pivoted on an axis 24 and operated in any desired manner by a suitable power means schematically indicated at M in FIG. 1 and controllable by the pilot of the aircraft, as indicated schematically by dotted line D, by a conventional pilot controllable means PC. The power means M may for example, comprise a hydraulic cylinder acting through a rack and pinion to rotate a shaft rotatable around the axis 24 and connected to the lever 23. It will be recognized that upon actuation of said lever 23 to rotate same in a counterclockwise direction as seen in FIG. 2, the foil will be raised into operating position and actuation of same in a clockwise direction will cause the foil to be collapsed. It will also be observed that if the operating mechanism becomes accidentally deenergized or the connecting linkage becomes ineffective, the airstream will cause the foil to collapse and hence nothing further is required to make same a fail-safe device.

FIG. 4 shows the foil 3 in collapsed condition and providing a small ridge projecting upward only a short distance, as a few inches, above the upper surface of the wing 2. FIG. 5 schematically indicates the condition of the segments in collapsed relationship.

The downwardly projecting foil 4 is of similar construction to the foil 3. It is similarly, but normally independently, operated as by a lever 26 rotatable around a pivot point 27, extendable to the position shown in FIG. 2 or collapsible to the position shown in FIG. 4. It will usually be somewhat smaller than the upper foil, such as one-third, preferably one-half, the vertical and horizontal extent of the upper foil.

These foils in the extended position provide the beneficial effects more fully described hereinafter, and when in collapsed position, provide low ridges near the wing tips which improve the aerodynamic operation of the wings sufficiently to more than compensate for the drag which they will create. It, therefore, it not necessary to collapse the foils 3 and 4 entirely into the wings inasmuch as said low ridges are beneficial and are therefore desirable.

Figure 7:
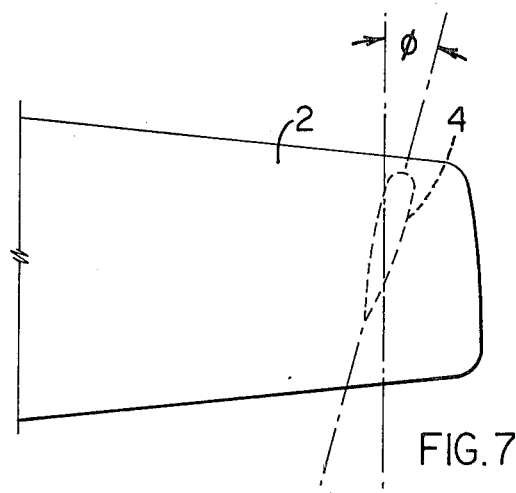
FIG. 7 is a view similar to FIG. 6 showing in broken lines the angled position of the bottom foil.

While the foils above-described are beneficial when positioned substantially parallel to the longitudinal axis of the aircraft, they are even more beneficial if they are angled somewhat as shown in FIGS. 6 and 7. FIG. 6 is a top view of a fragment of a wing near the tip thereof and shows the upper foil 3 angled with its leading edge toward such centerline by an angle of 10°. FIG. 7 is likewise from the upper side of the wing 2 and shows in broken lines the lower foil with its leading edge angled 10° away from said centerline. The amount of angling, or canting, for both the upper foil 3 and the lower foil 4 is somewhat variable, apparently between about 5° and 30° with an optimum at about 10°, although this optimum will vary somewhat with the specific type of wing.

Figure 8:
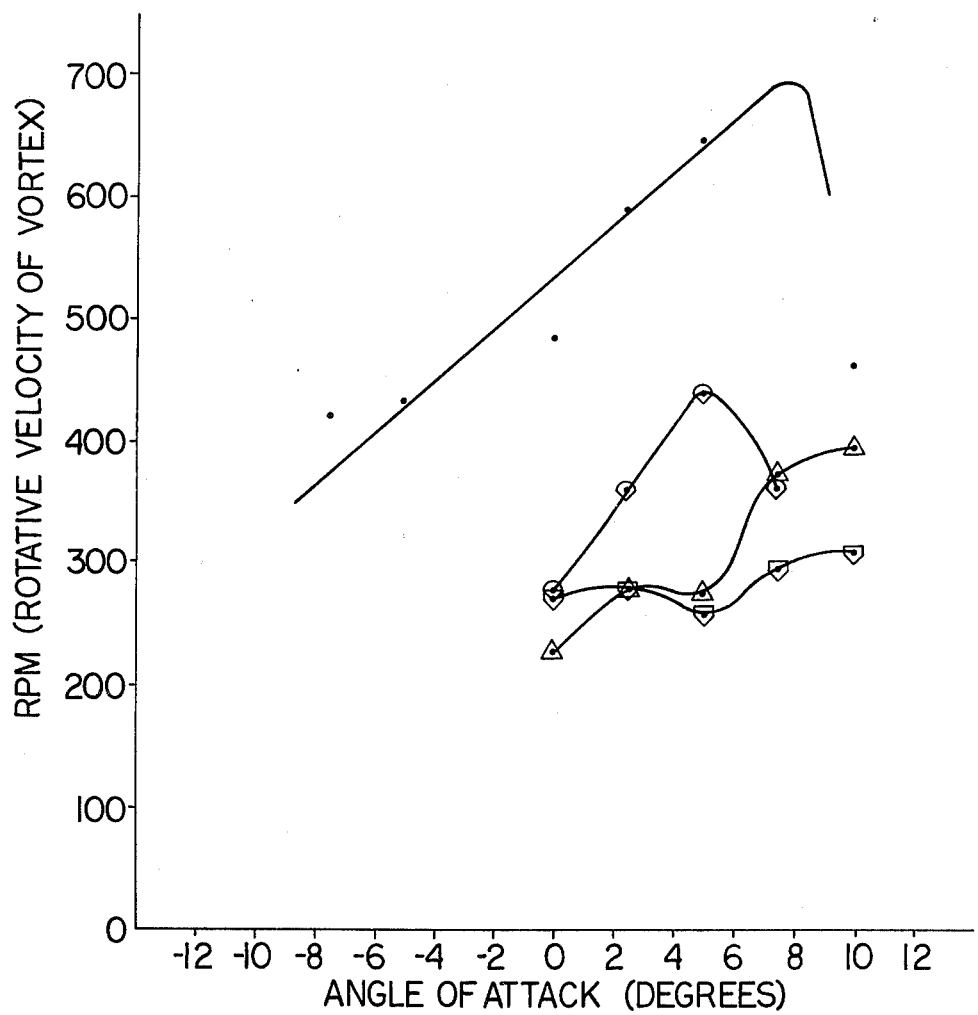
FIGS. 8 and 9 are diagrams showing the results of certain wind tunnel tests on wing models both with and without foils embodying the invention.
Figure 9:
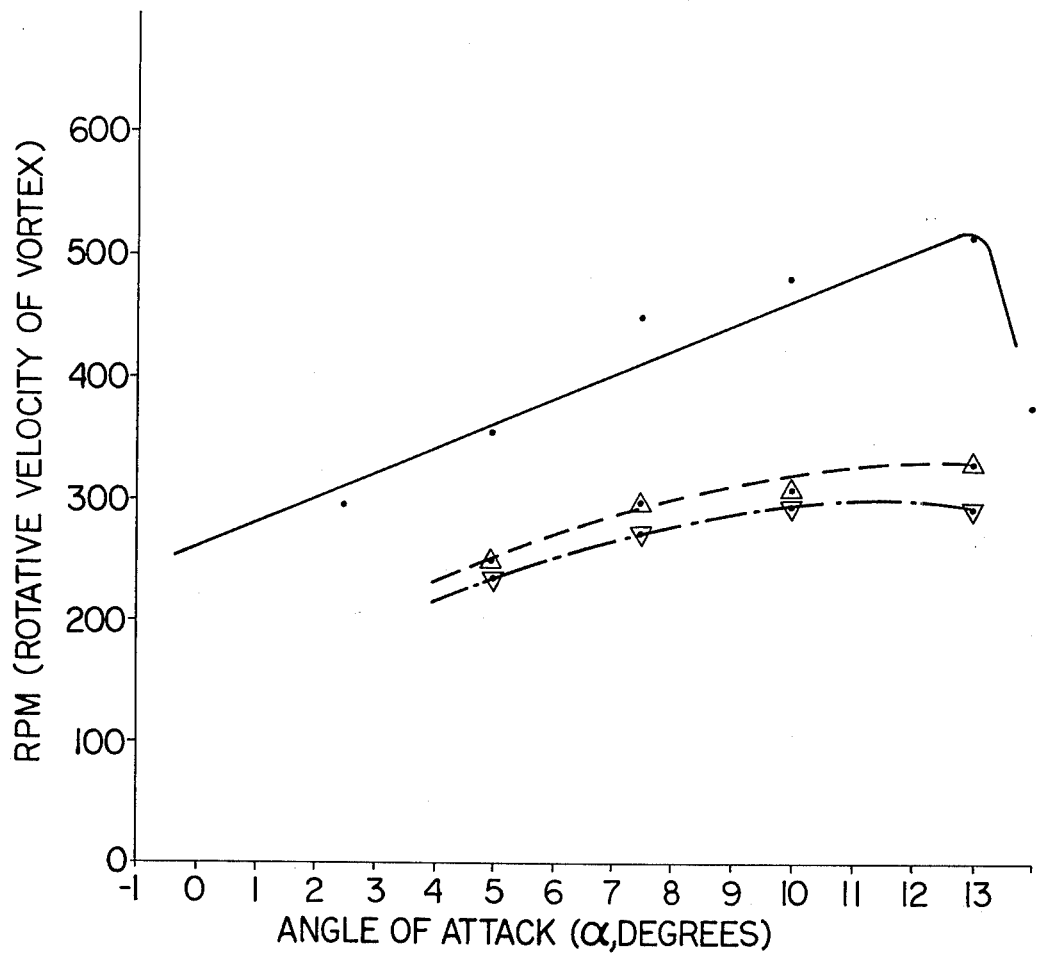

The device as mentioned has been extensively tested by closely controlled wind tunnel tests of various kinds, and has been shown consistently to be effective as stated. For example, FIG. 8 clearly shows that a number of different such foils applied to a model of a Boeing 747 wing and tested at different angles of attack produce in all such conditions a diminution of the rpm (revolution per minute) of the generated vortices. FIG. 9 shows the same results for a rectangular wing characteristic of a light airplane. In both of FIGS. 8 and 9 the rpm indicated indicates the rotative velocity of the vortex generated at the wing tip and provides an accurate indication of the vortex strength. It should be emphasized, however, that these test data are exemplary only and representative of data taken with varying foil areas, different wing shapes, and use of upper foil only or lower foil only. Such variations produced different specific results, such as in one case with the lower foil only and a rectangular wing, the optimum cant angle was 5°, and in another case with the upper foil only and a rectangular wing, the greatest vortex restriction was obtained at a cant angle of 20°. However, despite such individual variations in results resulting from the above-mentioned variations in test conditions, the results were generally consistent and as herein stated.

Figure 10:
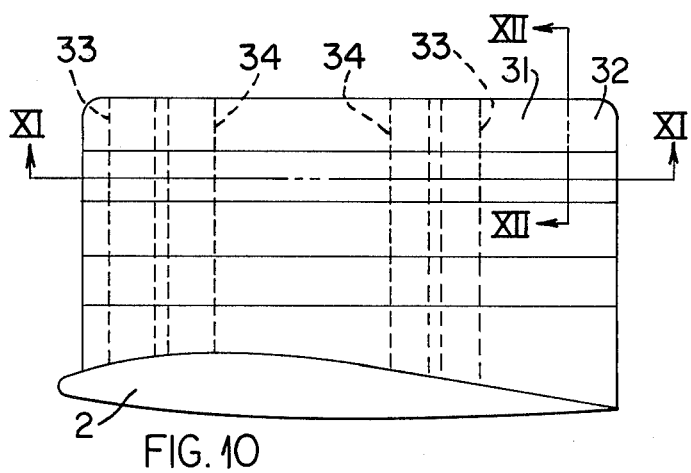
FIG. 10 is a sectional view similar to FIG. 2 showing a modification.
Figure 12:
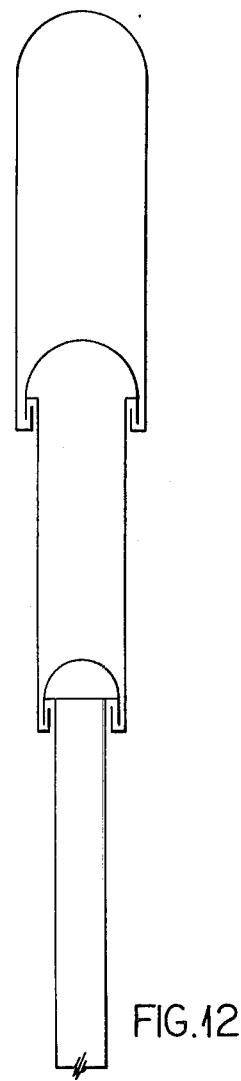
FIG. 12 is a schematic section taken on line XII—XII of FIG. 10.
Figure 11:
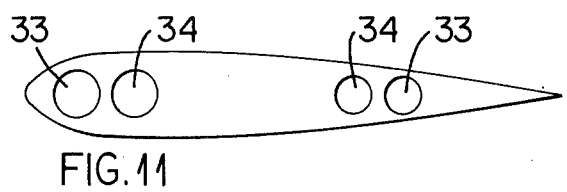
FIG. 11 is a schematic section taken on line XI—XI of FIG. 10.

FIG. 10 is a section essentially similar to the section of FIG. 2 but with the foil 31 projecting out of the wing 2 vertically rather than angularly as in the embodiment of FIGS. 1–7. The foil 31 has any suitable aerodynamic cross section as indicated in FIG. 11 and will be comprised of segments indicated at 32 providing a cross section shown in FIG. 12 which will be essentially identical to the cross section on FIG. 2 shown in FIG. 3. Any desired power means, or mechanism, may be employed to lift the foil, such as a telescoping cylinder (not shown) operated by a screw which is in turn driven by suitable rack and pinion from a hydraulic cylinder, or such as retractable and extendable hydraulic cylinders schematically indicated in FIG. 11 at 33 and 34, respectively. Power means, e.g. hydraulic, electrical, mechanical or other, may be provided as desired for lifting or collapsing said fin, but the details of said means may be conventional and constitute no part of the present invention and can be easily provided as desired by those skilled in the art. The rectilinearly expandable foil 31 shown in FIG. 10 may be provided also to extend downwardly from the wing in the same manner, including the same dimensional relationships, as mentioned above in connection with FIG. 2, and same may be actuated in the same manner as described for the foil 31. Likewise, when said foil or foils is (are) collapsed, it or they will form in such collapsed condition above or below the wing, or both, one or more low ridges adjacent the end of the wing as already above-mentioned as in connection with FIG. 2.

Other specific mechanical arrangements for extending and collapsing said foils will be apparent to those skilled in the art as well as other means for effecting such extending and collapsing.

The foils herein described effectively reduce the wing tip vortices as above-mentioned and as demonstrated in the wind tunnel tests illustrated in the above-mentioned graphs. When collapsed, the ridges formed by the collapsed foils function in an already known manner to inhibit flow of air from the bottom of the wing to the top thereof and thus increases the efficiency of the wings sufficiently to compensate, or more than compensate, for the slight additional drag created thereby.

In addition, it has been found that the foils above described sufficiently enhance the lifting efficiency of the wings so that a steeper rate of climb is possible at a given engine power output with obvious advantageous results. Further, at this point in the developing of the apparatus but without having determined same with certainty, it appears that there is a strong tendency for engine noise, or at least a portion thereof, to reflect back centerward of the airplane from said foils when extended, with the result that the pattern of noise emanating from a given aircraft is at least somewhat narrowed as compared to an aircraft not so equipped.

It should also be noted that it is believed that the foils embodying the concepts of the present invention will be essentially free from the vibrations which have often in the past occurred with fixed end plates on wing and/or tail surfaces. Such vibrations, if they occur at all, will be most severe at high speeds but since the foils will not be extended during higher speed operation or during operations lasting for the periods measured in hours between airports, the previously noted tendency of fixed end plates to generate destructive vibrations in wing and/or tail structures will be here sufficiently minimized, if they exist at all, as to be negligible.

Figure 13:
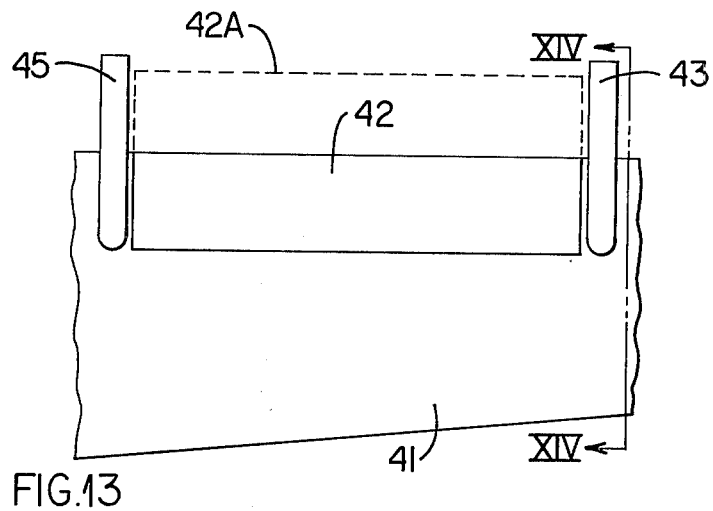
FIG. 13 is a top fragmentary view of a wing and a flap therein with the invention applied thereto for cooperation with such flap.
Figure 14:
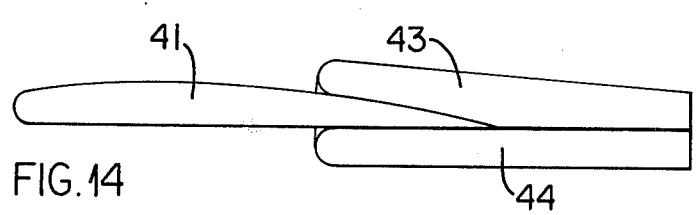
FIG. 14 is a section taken on the line XIV—XIV of FIG. 13 with the foils embodying the invention in collapsed condition.

Whereas the foregoing discussion has been primarily in terms of wing tip vortices and the placement of the foils of the invention adjacent wing tips, it has long been known that similar, and perhaps equally serious, vortices are generated at the ends of wing flaps and are also generated at the ends of stabilizers and elevators. Thus, it will be advantageous also to apply the concept of the invention to stabilizer and elevator tips in a manner generally similar to that above described and illustrated with respect to wing tips and it will be further advantageous to place retractable foils as above described either directly on wing flaps adjacent the ends thereof where same are large enough to accommodate such foils or to place the latter on the wing surfaces, either upper or lower or both, closely adjacent to the outboard and/or inboard ends of such wing flaps. This is set forth schematically in FIG. 13 wherein there is shown a top fragmentary view of a wing 41 having a flap 42 of any conventional nature and activated by any conventional means. An upper housing 43 is positioned at the trailing edge of the wing 41 adjacent one end of the flap 42 and projects rearwardly of the wing a distance substantially equal to the rearward projection of the flap when same is in its fully extended position, this latter being indicated by broken lines in FIGS. 13 and 15 and identified at 42a. A similar housing 44 is placed on the lower side of the wing and likewise projects rearwardly a distance at least as great as the rearward extension of the flap when in its fully extended position. Similar housings of which one appears at 45 are placed on the upper and lower surfaces of the wing adjacent the other end of the flap 42 for cooperation therewith in a manner hereinafter to be described with respect to the housings 43 and 44.

Contained within said housing 43 is an expansible and collapsible foil 46 which may be of the same construction as above already described in connection with the foil 3 and illustrated in various figures including FIGS. 1 and 2. Said foil is powered as convenient for rising out of said housing 43 to whatever extent is desired by the pilot of the aircraft, ultimately reaching a fully raised condition as shown in FIG. 15.

Figure 15:
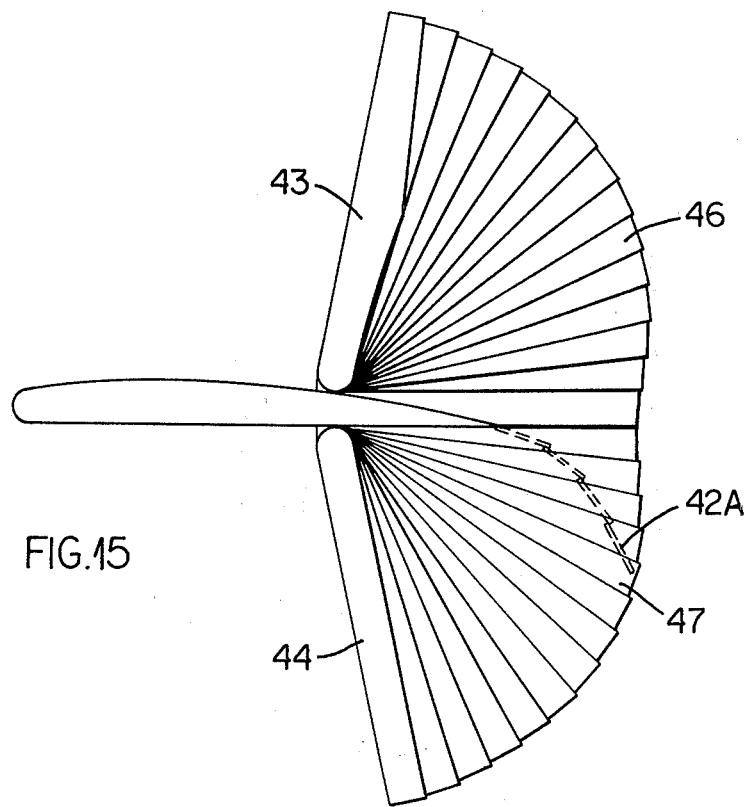
FIG. 15 is the same section as FIG. 14 with said foils in fully expanded condition.

A similar expansible and collapsible foil is contained within the housing 44 and arranged similarly, under the control of the pilot of the aircraft to be extended downwardly therefrom to the position shown at 47 in FIG. 15. Inasmuch as the flap when projected extends downwardly, it will be recognized that the lower foil is the more important of the two and in fact if desired the invention will be of value even if the upper flap 46 is diminished in size, length, height or both, as compared to the lower foil 47 or even if said upper foil 46 is eliminated entirely.

Similar foils likewise appropriately controlled by the pilot are arranged to project out of the housings at the other end of the flap 42. In a multi-flap wing, such as that on the Boeing 747, it will be preferable for obvious reasons to provide both ends of all flaps with expansible and retractable foils as above described excepting perhaps that the extreme inner end of the inboard flap where the construction is such that the proximity of the aircraft fuselage in effect seals the inboard end of the inboard flap. However, inasmuch as the pressure differential between the upper and lower wing surfaces is the greatest at this point, if there is any appreciable spacing between such fuselage and the adjacent end of the nearest flap, then the foils embodying the invention will be of value here also.

It will be appreciated that the construction of the present invention enables the collapsible foil always to be in a position substantially perpendicular to the surface of the airfoil in question regardless of the degree to which it may be extended or retracted. Hence, even in a partially extended position it will be effective for the purposes intended and above described and the degree of tip vortex control desired in a given instance may be selected by the pilot at any point between maximum and minimum extension of said foils with effective control and same being graduated in amount as desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. For an airfoil of an aircraft having a longitudinal centerline, wherein the airfoil includes an upper surface, a lower surface and an end, the improvement comprising:
   a collapsible foil positioned substantially perpendicular to one said surface of said airfoil at least adjacent said end thereof and aligned at least approximately parallel to the longitudinal centerline of said aircraft, said collapsible foil comprising a plurality of nestable segments; and
   controllable power means for selectably extending said foil into an extended position projecting away from said one airfoil surface and collapsing said foil to a collapsed position defining not more than a low profile with respect to said one airfoil surface while in all positions maintaining the extended portion thereof substantially perpendicular to said one airfoil surface.

2. The device of claim 1 wherein said airfoil is an aircraft wing with said collapsible foil positioned on the upper surface thereof.

3. The device of claim 1 wherein said airfoil is an aircraft wing with said collapsible foil placed on the lower surface thereof.

4. The device of claim 1 wherein said airfoil is a flap positioned on a wing and said collapsible foil is placed on the upper surface of said wing adjacent an end of said flap.

5. The device of claim 1 wherein said airfoil is a flap positioned on a wing and said collapsible foil is placed on the lower surface of said wing adjacent an end of said flap.

6. The device of claim 1, wherein said controllable power means is controllable by the pilot of the aircraft.

7. The device of claim 1, including an upper said collapsible foil positioned on the upper surface of said air foil and a lower said collapsible foil positioned on the lower surface of said airfoil.

8. The device of claim 7 wherein the airfoil is a wing and the longitudinal length of said lower foil is between one-third and two-thirds that of said upper foil.

9. The device of claim 7 wherein the airfoil is a wing and the vertical dimension of said lower foil is between one-third and two-thirds that of the upper foil.

10. The device of claim 7 wherein the airfoil is a wing and the longitudinal length of said lower foil is one-half that of said upper foil.

11. The device of claim 7 wherein the airfoil is a wing and the vertical dimension of said lower foil is one-half that of the upper foil.

12. The device of claim 1 wherein said foil is positioned parallel to the longitudinal centerline of said aircraft.

13. The device of claim 1 wherein said foil is positioned at an angle to the longitudinal centerline of said aircraft between about 5° and about 30°.

14. The device of claim 1 wherein said foil is positioned at an angle to the longitudinal centerline of said aircraft at about 10°.

15. The device of claim 8 wherein the leading edge of the upper said foil is angled toward said longitudinal centerline and the leading edge of said lower foil is angled away therefrom.

16. The device of claim 1, wherein said segments are interlockable and tapered segments and include a leading edge segment, said segments being so arranged that the lifting of said leading-edge segment will pull therewith all said segments and thereby extend said foil and reverse movement of said leading-edge segment will effect collapsing of said foil.

17. The device of claim 1, wherein said segments are essentially interlocked rectangular segments and include an outermost segment, said segments being so interlocked that power applied to said outermost segment thereof will effect lifting of the remaining said segments to cause said foil to assume an extended position and reverse movement of said outermost segment will effect collapsing of said foil.

18. The device of claim 17, wherein said controllable power means comprise power operated extendable and retractable means provided within said foil for effecting extension and collapsing thereof.

19. The device of claim 1 wherein the airfoil is a wing and said foil in the collapsed condition defines a low ridge projecting upwardly from said upper surface and thereby inhibits end flow of air from the bottom to the top of said wing.

20. The device of claim 4, wherein said foil in the collapsed condition defines a low ridge projecting upwardly from the upper surface of the wing on which it is mounted, said foil projecting rearwardly of the trailing edge of said wing a distance substantially equal to the corresponding rearward projection of said flap when said flap is in its fully extended position.

21. The device of claim 5, wherein said foil in the collapsed condition defines a low ridge projecting downwardly from the lower surface of the wing on which it is mounted, said foil projecting rearwardly of the trailing edge of said wing a distance substantially equal to the corresponding rearward projection of said flap when said flap is in its fully extended position.

22. For an airfoil of an aircraft having a longitudinal centerline, wherein the airfoil includes an upper surface, a bottom surface and an end, the improvement comprising:
a collapsible foil oriented substantially perpendicular to one said surface of said airfoil at least adjacent said end thereof and aligned at least approximately parallel to the longitudinal centerline of said aircraft; and
controllable power means for selectably extending said foil into an extended position and collapsing said foil to a fully collapsed position, said collapsible foil in said extended position projecting away from said one airfoil surface, said collapsible foil in its fully collapsed position presenting a covered profile but still protruding beyond said one airfoil surface, said collapsible foil in all its positions remaining substantially prependicular to said one airfoil surface and protruding beyond said one airfoil surface.

23. The device of claim 22, wherein said collapsible foil comprises a plurality of interlocked segments relatively shiftable from a substantially side-by-side relation in said collapsed position of said foil to a relation of reduced overlap in an extended position of said foil.

* * * * *